J. E. BURTON.
PLOW ATTACHMENT.
APPLICATION FILED JAN. 14, 1909.
935,739.
Patented Oct. 5, 1909.
2 SHEETS—SHEET 1.
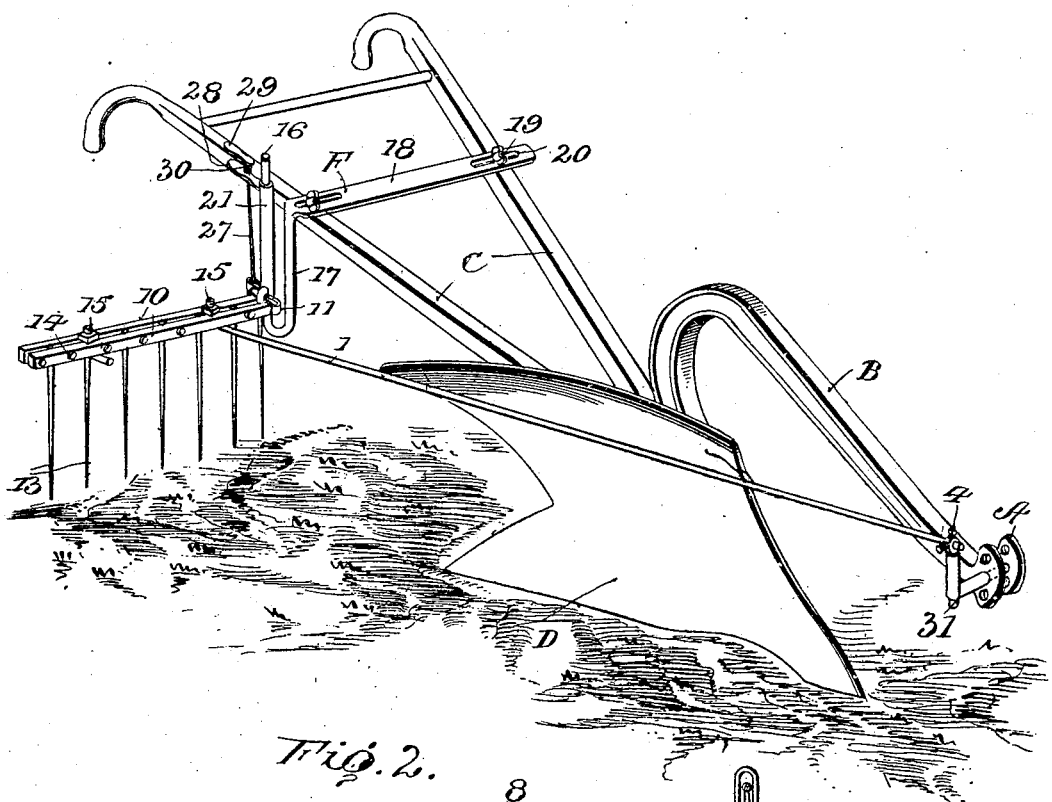
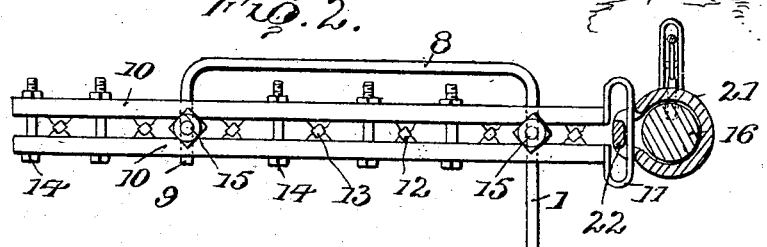
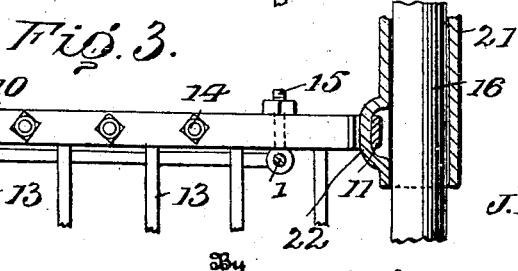
Inventor
J. E. Burton J. E. BURTON.
PLOW ATTACHMENT.
APPLICATION FILED JAN. 14, 1909.
935,739.
Patented Oct. 5, 1909.
2 SHEETS—SHEET 2.
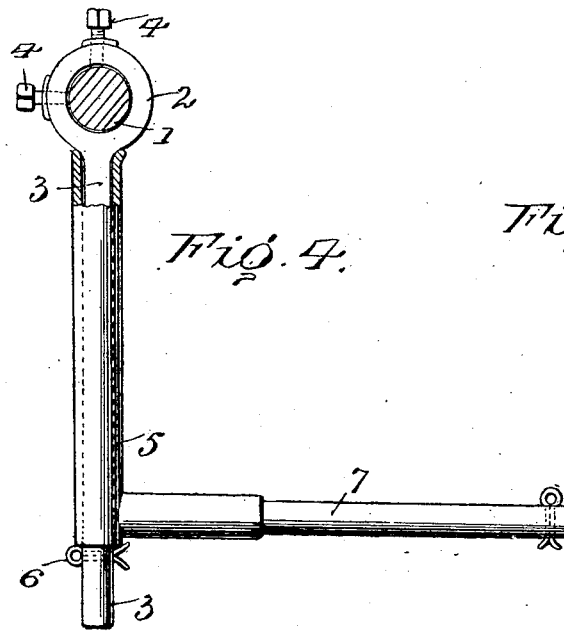
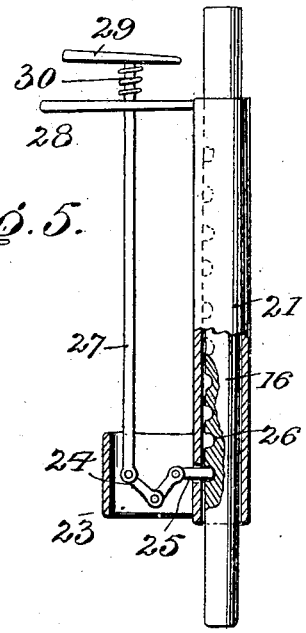
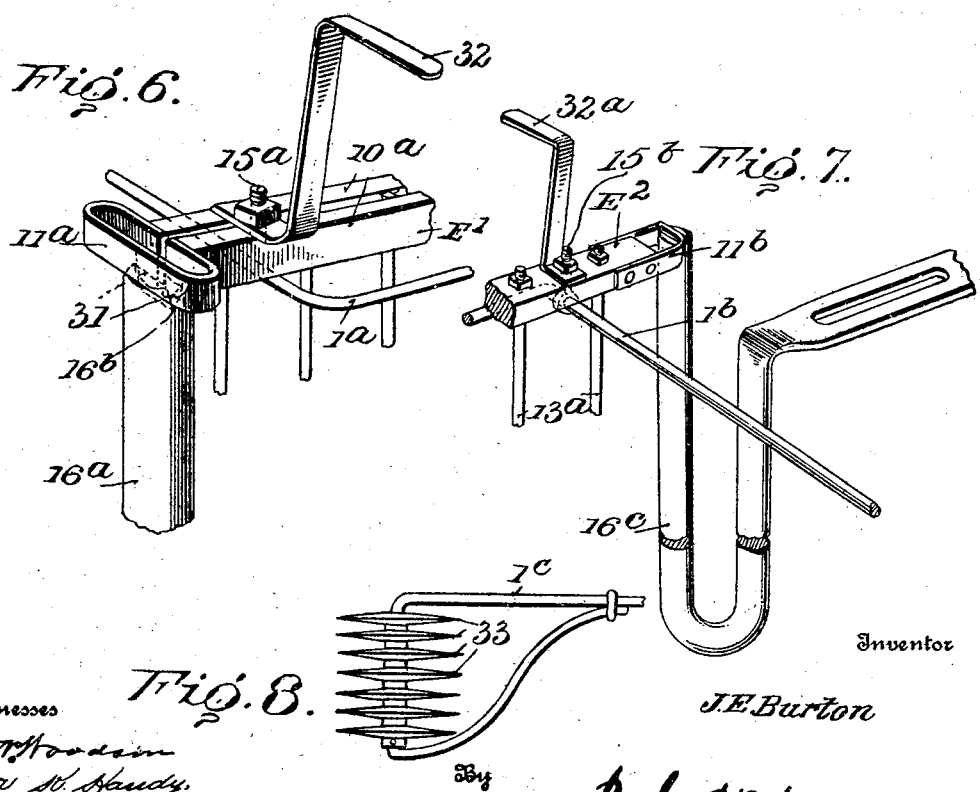
Witnesses
Inventor
J. E. Burton
By
Attorneys

UNITED STATES PATENT OFFICE.

JAMES E. BURTON, OF WHITEWATER, WISCONSIN.

PLOW ATTACHMENT.

935,739. Specification of Letters Patent. Patented Oct. 5, 1909.

Application filed January 14, 1909. Serial No. 472,271.

*To all whom it may concern:*

Be it known that I, JAMES E. BURTON, a citizen of the United States, residing at Whitewater, in the county of Walworth and State of Wisconsin, have invented certain new and useful Improvements in Plow Attachments, of which the following is a specification.

The object of this invention is a cheap, light and simple construction in drag attachments for plows, which by its arrangement of parts may be easily secured to a walking plow and properly adjusted at the rear of the mold-board irrespective of the particular type of plow to which it is attached, or the length of the beam thereof, the invention also making provision for the lateral adjustment of the drag attachment if desired.

With this and other objects in view, the invention consists in certain constructions, arrangements and combinations of parts that I shall hereinafter fully describe and claim.

For a full understanding of the invention reference is to be had to the following description and accompanying drawings, in which, Figure 1 is a perspective view of a walking plow equipped with my improved drag attachment. Fig. 2 is a horizontal sectional view through the rear end of the attachment, the harrow frame being shown in top plan view. Fig. 3 is a transverse sectional view of the attachment looking at the front of the harrow frame. Fig. 4 is a detail view, partly in section, illustrating the connection of the draft rod with the means for holding it at the front end of the plow. Fig. 5 is a detail view, partly in section, of one form of device for holding the drag attachment at different elevations. Figs. 6 and 7 are detail views illustrating different modified forms, and Fig. 8 illustrates in top plan view another modified form in which the drag device is a harrow of the revolving disk type.

Corresponding and like parts are referred to in the following description and indicated in all the views of the drawings by the same reference characters.

Referring to the drawings, A designates the clevis, B the beam, C the handles and D the mold-board of a walking plow which I have here selected for the purpose of illustration only, and which may be of any desired type of construction.

1 designates the draft rod for the harrow or other drag attachment. This rod is designed to extend longitudinally to one side of the plow and is intended to have its front end mounted in a socket 2 that is formed on the upper end of a vertically disposed pin or post 3, the rod projecting through the socket and being held therein rigidly as against both a longitudinal and rotary movement by set screws 4 or similar clamping devices. The supporting post 3 is mounted within a vertically disposed tube 5 and extends therethrough, being held detachably therein by means of a cotter pin 6, or the like. The tube 5 is formed on one end of a transversely extending pin 7 which may be secured by any desired clamps to the plow beam, but which is preferably inserted through the clevis and held therein by a cotter, or the like.

The rear end of the draft rod 1 is extended outwardly, as indicated at 8, and thence forwardly as at 9, to form a U-shaped frame upon which the harrow E or drag attachment is intended to be supported. In one embodiment of the invention, the harrow E comprises front and rear metal bars 10 which are joined together at one end by a preferably longitudinally elongated spring loop 11, which may be either secured thereto or formed integral therewith. The bars 10 are formed on their opposing faces with shoulders 12 forming clips between which the harrow teeth 13 may be clamped when the two bars are drawn together and held by means of a series of clamping bolts 14. In order to adjustably secure the harrow upon the frame formed by the angular construction of the draft rod 1 at the rear end thereof, I may employ eye-bolts 15 that are slipped upon the draft rod and that pass upwardly between the front and rear bars 10 of the harrow, the nuts of the bolts being tightened to hold the harrow securely in place after the two bars 10 have been securely clamped together, the said nuts bearing upon the upper faces of the bars.

F designates a bracket which is designed to be secured to the handle portion of the plow and which is intended to support the rear end of the rod 1 and the harrow or other drag attachment mounted thereon. This bracket is formed with a substantially U-shaped portion embodying outer and inner standards designated 16 and 17 respectively, the inner standard 17 being formed with or secured to an attaching bar 18 which is designed to extend across the handles C and which is intended to be detachably and adjustably connected to said handles by hook bolts 19 or similar fastening devices engaging the handles and mounted in slots 20 formed in the attaching bar, the slots providing for the lateral adjustment of the bolts for handle portions of varying widths.

A vertically disposed sleeve 21 is slipped over the outer standard 16, the said sleeve being formed with an open bracket 22 by which it is directly secured to the frame of the harrow. For instance, the said frame may be secured to this bracket 22 by slipping two of the bars 10 through the bracket before the bars are clamped together and turning the harrow frame around until the loop 11 is mounted in the bracket. It is to be noted that this construction permits the harrow frame to have a limited forward and backward movement in the bracket 22. The sleeve 21 carries a casing 23. An angle lever 24 is journaled at its elbow in the casing 23, and one end of said lever is connected to a latch 25 which is adapted to extend through an opening in the sleeve and into engagement with any one of a vertically extending series of sockets or keepers 26 formed in the outer standard 16. The other arm of the lever 24 is pivotally connected to a handle rod 27 which extends up through the relatively stationary handle 28 that projects outwardly from the upper end of the sleeve 21, the upper end of the handle rod carrying a hand grip 29. An expansion spring 30 encircles the rod 27 between the hand grip 29 and handle 28 and exerts a tension upon the rod in a direction to move the latch 25 into locking engagement with the standard 16. By gripping the handle 28 and hand grip 29, the operator may, by pressing the two together, release the latch 25 from the standard 16 and raise and lower the sleeve 21, thereby effecting the raising and lowering of the harrow, which by this means may be adjusted to work at different depths if required. It is obvious that by this means also, the harrow may be raised to an inoperative position out of the ground and held in such position by engagement of the latch 25 with the standard 16, when the plow is turning corners, or whenever for any other purpose this inoperative position of the harrow is desired.

For a modification of my invention, reference is to be had to Fig. 6, wherein the harrow frame designated E′ is substantially like the harrow frame before described, except as will be now noted. The front and rear bars $10^a$ of the harrow frame E′ are provided at their connection with the spring loop $11^a$, with depending lugs 31 which meet to form practically one lug when the bars are clamped together and which are designed to engage a notch $16^b$ in the supporting standard $16^a$ when the harrow is raised to an inoperative position and moved slightly inwardly, the harrow being thereby supported out of the ground. In order to raise the harrow, as shown in this view, as a modification of the adjusting means before described, a handle 32 is provided which is formed with oppositely extending angle ends, the lower one of which is drilled so that it may be slipped over one of the eye-bolts $15^a$ that secure the harrow to the draft rod $1^a$, the nut of said bolt clamping the handle down upon the bars of the harrow.

It is to be understood that my invention is not limited to a harrow frame constructed of metal, as described. For instance, as illustrated in Fig. 7, $E^2$ designates a harrow which is constructed of wood with the teeth $13^a$ driven therein, the harrow being supported upon the rod $1^b$ and secured thereon by eye-bolts $15^b$, and being provided at one end with a metal strip $11^b$ which constitutes the loop which receives the standard $16^c$. $32^a$ designates the handle in this instance, secured to the harrow like the handle 32, and by which the harrow may be raised to slide the loop $11^b$ upwardly on the standard $16^c$, and by pulling slightly inwardly on the harrow will cause the lower edge of the loop $11^b$ to enter the notch in the upper end of the standard, whereby to support the harrow in an inoperative position. It is also to be understood that my invention is not limited to a harrow as the drag devices, nor to a particular form of harrow as the toothed harrow hereinbefore set forth. For example, as illustrated in Fig. 8 the harrow may be of the revolving disk form, the gang of disks 33 being mounted upon the outwardly extending rear end of the draft rod $1^c$ and revolving thereon as an axle.

In the practical operation of my improved drag attachment, the draft rod is secured to the front end of the beam or to the clevis by the means hereinbefore described and is adjusted in its supporting post according to the particular length of the beam holding the desired position of the harrow in the rear of the mold-board, and the harrow is let down upon the standard 16 into operative relation to the ground, being supported by the said rod which will thus serve as a drag rod to drag the harrow along as the plow is advanced. In turning corners, or for any other purpose, it is desired that the harrow shall be held in an elevated or inoperative position, the devices hereinbefore described, are employed to lift the harrow out of the ground and support it either by the engagement of the latch 25 with one of the higher notches 26 of the standard 16, or by resting the lugs 31 or lower edge of the strap $11^b$ on the notched upper end of the standard $16^a$ or $16^c$.

It is evident that the lateral adjustment of the attaching bar 18 provides not only for the fastening of the bracket F to plows with handle portions of different width, but also enables the operator to position the harrow or other drag devices different distances from the plow beam, in the rear of the moldboard. It is to be noted that after it has once been adjusted to the plow, my improved device may be attached or detached without the necessity of a wrench or any implement of this kind.

Having thus described the invention, what is claimed as new is:—

1. The combination with a plow, a draft rod connected at its front end thereto and formed with an outwardly and upwardly extending rear end constituting a supporting frame, a drag device adjustably mounted upon said frame and provided at its inner end with a loop, and means carried by the handle portion of the plow for engaging said loop.

2. The combination with a plow, of a draft rod connected thereto near its front end and extending rearwardly along the plow to one side thereof, the draft rod being formed with an angular rear end constituting a frame, a drag device supported on said frame and provided at its inner end with a loop and a bracket secured to the plow and arranged for engagement with said loop.

3. The combination with a plow, of a draft rod connected thereto and extending rearwardly along the plow to one side thereof, a drag device carried by the rear end of said rod and provided at its inner end with a loop, a bracket secured to the plow and embodying an upwardly extending standard and a vertically movable connection between said standard and loop.

4. The combination with a plow, of a draft rod connected thereto near its front end and extending rearwardly along the plow at one side thereof, a drag device carried by the rear end of said rod, a bracket adjustably connected to the handle portion of the plow and embodying an upwardly extending standard, a vertically movable connection between said standard and the inner end of the drag device, and means for holding the drag device in an elevated position on the standard.

5. The combination with a plow provided with a clevis, of a pin extending transversely through said clevis, a vertically disposed tube secured to one end of said pin, a post mounted in said tube and provided at its upper end with a socket, a draft rod adjustably mounted in said socket and designed to extend rearwardly along one side of the plow, a drag device carried by the rear end of said rod, and means for connecting said drag device with the plow.

In testimony whereof I affix my signature in presence of two witnesses.

JAMES E. BURTON. [L. S.]

Witnesses:
ROBT. C. BULKLEY,
H. E. COONETZ.